Nov. 9, 1948.  R. G. LE TOURNEAU  2,453,237
MULTIPLE DISK FRICTION COUPLER
Filed Aug. 6, 1946
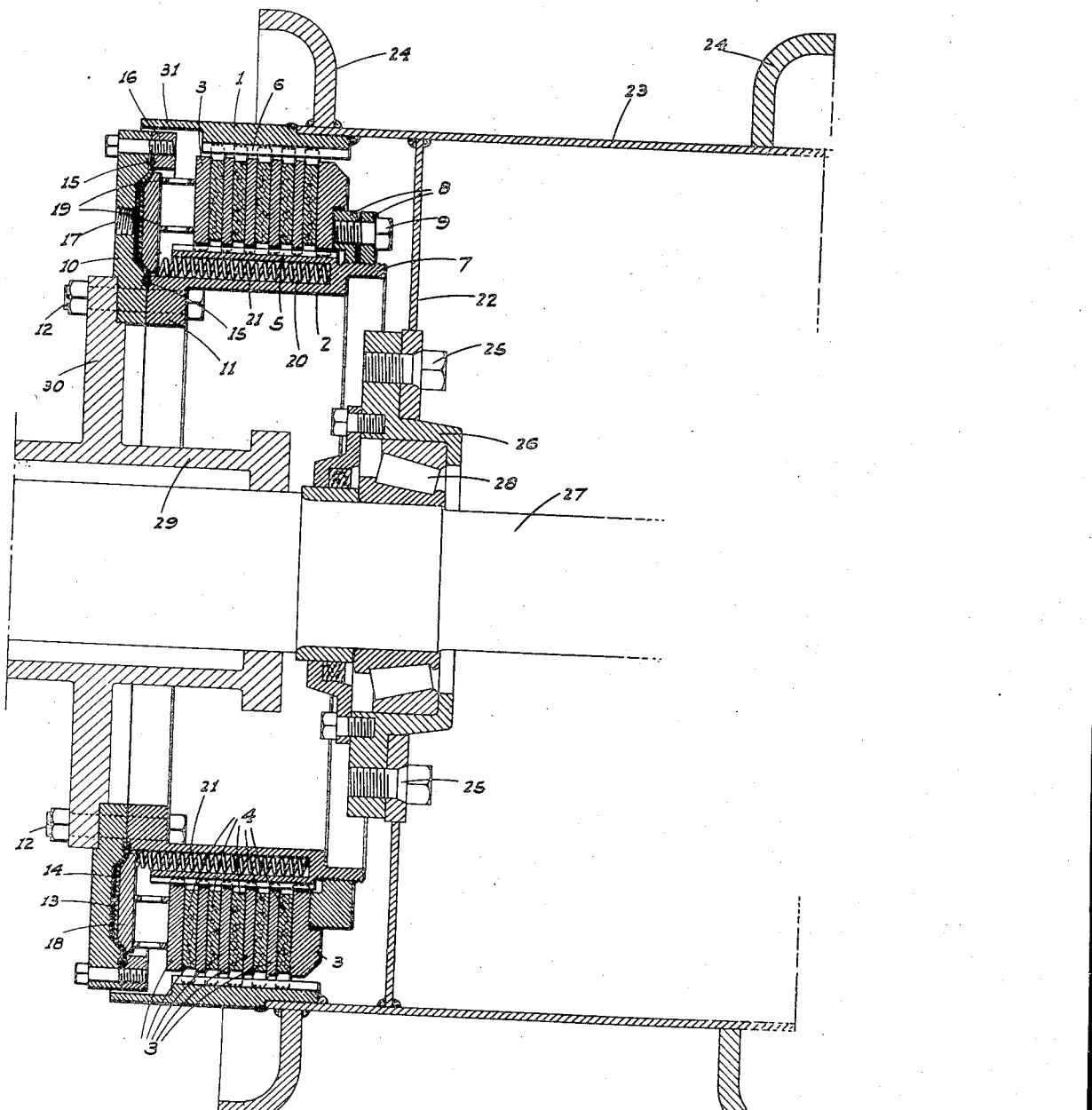
INVENTOR
R. G. LeTourneau
BY
ATTORNEYS Patented Nov. 9, 1948

2,453,237

UNITED STATES PATENT OFFICE 2,453,237

MULTIPLE-DISK FRICTION COUPLER

Robert G. Le Tourneau, Peoria, Ill., assignor to R. G. Le Tourneau, Inc., Stockton, Calif., a corporation of California Application August 6, 1946, Serial No. 688,672

4 Claims. (Cl. 188—152)

This invention relates in general to an improved friction coupler.

The invention is directed particularly to, and it is an object to provide a disc type friction coupler adapted for use as a brake, although suited for use as a clutch. The invention is herein described as employed as a wheel brake for vehicles.

Another object of the invention is to provide a wheel brake, as above, which is fluid-pressure actuated, preferably by air; the brake being normally spring released, but arranged to be engaged through the medium of an operator controlled fluid-pressure actuated diaphragm unit.

A further object of the present invention is to provide a wheel brake which comprises, in combination with a pair of concentric relatively rotatable drums, a series of cooperating friction discs disposed in axially shiftable face to face relation between the drums and alternately splined to different ones of the latter, a stop beyond one end of the series of discs, and a fluid-pressure actuated diaphragm unit mounted beyond the other end of the series of discs and including a diaphragm operated brake control ring forcefully movable toward said series of discs whereby to clamp the same into close frictional contact to produce a braking action between said drums.

An additional object of the invention is to provide a wheel brake, as in the preceding paragraph, which includes perforate connectors between the diaphragm operated brake control ring and the adjacent brake disc of said series, whereby to minimize heat transfer between the discs and the diaphragm unit.

It is also an object to provide a wheel brake which is simple but rugged in construction; practical and smooth operating in use; and requires only a minimum of maintenance or repair.

These objects are accomplished by means of such structure and relative arrangement of parts as will fully appear by a perusal of the following specification and claims.

The figure of the drawings is a cross section of the brake as embodied in connection with a vehicle wheel.

Referring now more particularly to the characters of reference on the drawing, the brake comprises an outer drum 1 and an inner drum 2 disposed in radially spaced, concentric relation; said drums being relatively rotatably mounted in the manner which will hereinafter appear, and wherein the inner drum 2 is fixed against rotation.

A series of annular friction discs are axially slidably disposed between the inner and outer drums 1 and 2, and such series comprises, in alternate relation, metal discs 3 and fiber discs 4. Multiple spline connections 5 couple the metal discs 3 at their inner edges to the inner drum 2, while multiple spline connections 6 couple the fiber discs 4 at their outer edges to the outer drum 1; whereby the metal discs 3 are non-rotatable relative to the inner drum 2, and the fiber discs 4 are non-rotatable relative to the outer drum 1. By this arrangement discs 3 and 4 remain axially shiftable relative to each other and to the drums.

At one end the inner drum 2 is formed with a neck 7 having exterior threads, and on which neck an adjustable stop ring 8 is threaded; said ring being peripherally split at one point and including a locking bolt 9 by means of which the ring 8 may be secured on the neck 7 against undesirable release or rotation. The ring 8 bears against the adjacent endmost one of the metal discs 3 and thus serves as a stop for the latter.

At the end opposite the stop ring 8, the device includes an end ring 10 fixed in connection with the inner drum 2 by means of an integral radial flange 11 on the latter; the end ring 10 and flange 11 being secured together by a circumferential row of cap screws 12. On the face adjacent the series of discs 3 and 4, the end ring 10 is formed with a relatively shallow annular channel 13 of substantial width, and a flexible annular diaphragm 14 of material such as fabric reinforced "neoprene" is seated in matching relation in said channel. At its edges the diaphragm 14 is formed with beads 15. The outer bead 15 is clamped between a collar 16 and the adjacent portion of the end ring 10, while the inner bead 15 is clamped between the flange 11 and the adjacent portion of said end ring.

A port 17 opens through the end ring 10 into the pressure chamber formed between said end ring and the diaphragm 14. An operator-controlled fluid pressure system (not shown) is adapted to connect with the port 17 whereby fluid pressure, preferably air pressure, may be delivered, as desired, through the port 17 into the aforesaid pressure chamber.

A control ring 18 complementary to the channel 13 normally seats in the latter against the exterior of the diaphragm 14, and radially spaced perforate connectors 19 are fixedly connected between the control ring 18 and the adjacent metal disc 3. By reason of these perforate connectors heat exchange between the series of discs 3 and 4 and the described diaphragm arrangement is minimized.

The inner drum 2 is formed with a plurality of sockets 20 therein parallel to the drum axis and opening from said drum at the end adjacent the end ring 10. Loaded compression springs 21 are seated in said sockets and bear against the control ring 18, whereby to normally maintain the latter and the diaphragm fully seated in the channel 13.

In the present embodiment the above described brake is incorporated in a vehicle wheel as follows:

The numeral 22 indicates a vehicle wheel having a wheel rim 23 and rim flanges 24; the wheel being detachably secured by bolts 25 to a hub 26 journaled on a spindle 27 by means of a bearing 28. Inwardly of the bearing 28 the spindle 27 is carried in a fixed non-rotatable housing 29.

The housing 29 includes a fixed annular flange 30 which projects radially outwardly, and the end ring 10 is secured concentrically to the flange 30 by means of the bolts 12 which are of a length to extend therethrough.

This disposes the inner drum 2 in surrounding and concentric but clearance relation to the housing 29. The outer drum 1 is fixed to the inner edge portion of the wheel rim 23, as for example by welding, as shown. In this manner the outer drum 1, together with the fiber discs 4, rotates with the wheel 22, while the inner drum, 4, together with the metal discs 3, remain stationary with the fixed housing 29.

The brake is normally released by reason of the springs 21 urging the control ring 18 to its fully seated position in channel 13. However, when fluid pressure is introduced through the port 17 the diaphragm flexes or expands in a direction toward the series of discs 3 and 4, advancing the control ring 18 in the same direction. This movement of the control ring, as imparted through the connectors 19, clamps the discs 3 and 4 in close frictional contact, whereby relative rotation therebetween is effectively resisted, producing a braking action which imparts itself to the wheel 22.

In order to prevent access of foreign matter into the brake assembly, particularly to the discs 3 and 4, a flange 31 is formed on the free end of the outer drum 1 and closely overhangs the periphery of the end ring 10.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A friction coupler comprising an outer drum surrounding an inner drum in spaced concentric relation, the drums being mounted for relative rotation, a series of annular friction discs disposed in face to face relation between the drums, means axially shiftably but relatively non-rotatably connecting alternate discs to the inner and outer drums respectively, a stop at one end of the series of discs, and fluid pressure actuated means disposed to act on said series of discs from the other end whereby to clamp the discs into close frictional contact; said last named means comprising an end ring disposed beyond said other end of the series of discs and fixed in connection with one drum, an annular diaphragm sealed in cooperative pressure chamber forming relation with the face of the end ring adjacent said series of discs, means adapted to feed fluid pressure into the chamber, an axially movable control ring bearing against the diaphragm on the side adjacent said series of discs, and means connecting the control ring in rigid relation to the adjacent disc, there being a plurality of sockets formed in said one drum and opening toward the end ring, and compression springs in the sockets bearing against the control ring.

2. A friction coupler comprising an outer drum and an inner drum surrounding each other in spaced relation and being mounted for relative rotation, a series of annular friction discs, alternate discs being splined to the outer and inner drums, respectively, and all the discs being simultaneously shiftable axially, stop means at the end of one drum interposed in the path of the discs to limit their movement in one direction, a hydraulic motor mounted at the opposite end of said drum, such motor including a pressure operated control ring mounted co-axially with the discs, the inner periphery of the ring projecting radially inward of the circle defined by the outer circumference of said one drum, yieldable means acting against the inner face of the said projecting portion of the ring to urge the ring in a direction away from the discs, means to apply pressure against the outer face of the ring to force it in a direction toward the discs, and connector means between the inner face of the ring and the discs acting to force the discs together as the ring moves toward the discs.

3. A friction coupler comprising an outer drum and an inner drum surrounding each other in spaced relation and being mounted for relative rotation, a series of annular friction discs, alternate discs being splined to the outer and inner drums, respectively and all the discs being simultaneously shiftable axially, stop means at the end of one drum interposed in the path of the discs to limit their movement in one direction, a hydraulic motor mounted at the opposite end of said one drum, such motor including a pressure operated control ring mounted co-axially with the discs, yieldable means acting against the inner face of the ring to urge it in a direction away from the discs, means to apply pressure to the outer face of the ring to force it in a direction toward the discs and a connector element directly connected to the ring and to the adjacent disc.

4. A combination as in claim 3 in which the connector element is perforated to provide insulating air gaps.

ROBERT G. LE TOURNEAU.

REFERENCES CITED

The following references are of record in the file of this patent:

UNITED STATES PATENTS

| Number | Name | Date |
|---|---|---|
| 1,433,491 | Strong | Oct. 24, 1922 |
| 2,014,630 | O'Brien | Sept. 17, 1935 |
| 2,368,417 | Lambert | Jan. 30, 1945 |